Figure 1:
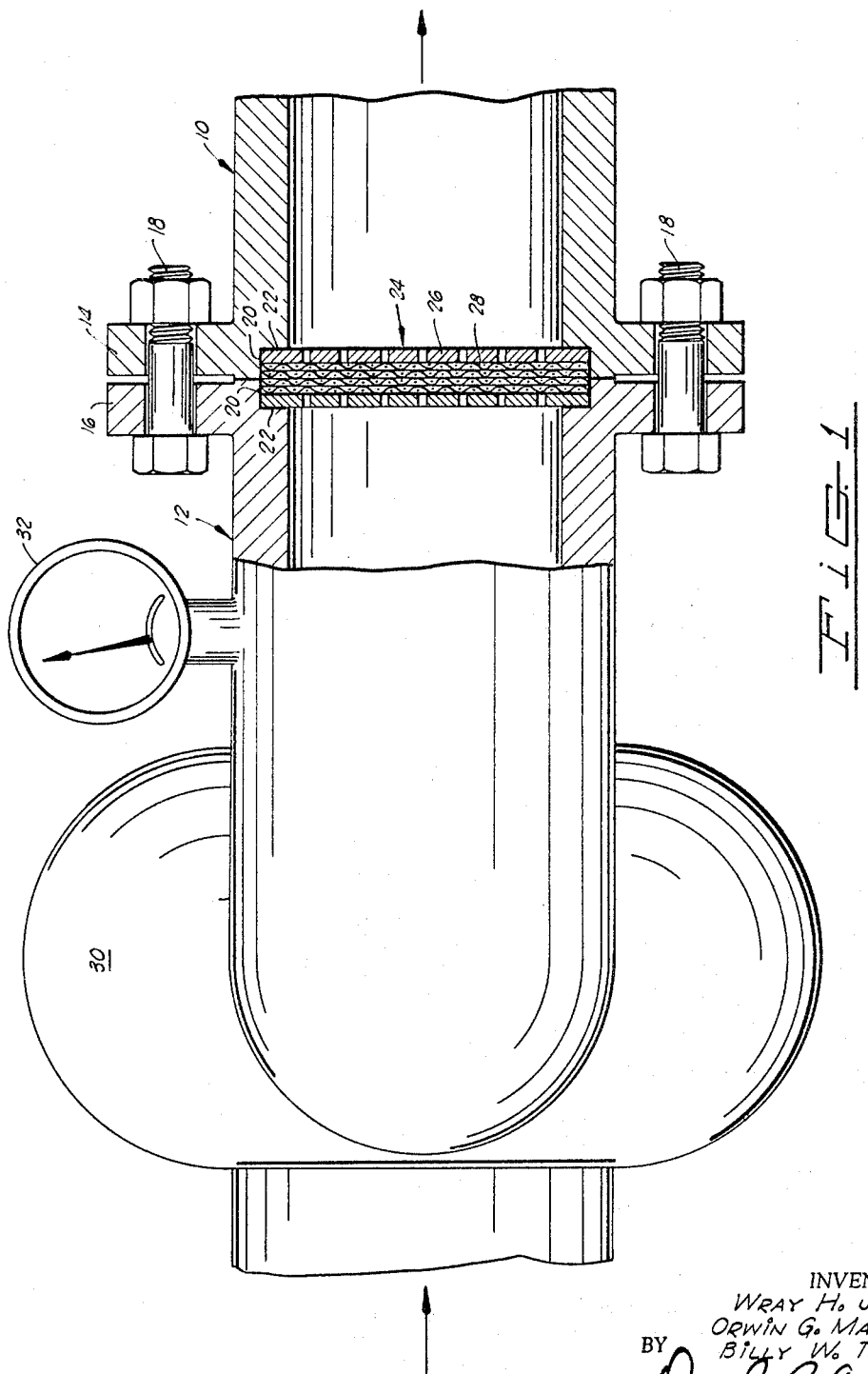

Sept. 20, 1966 W. H. JONES ETAL 3,273,319
DEVICE FOR REMOVING ENTRAINED GASES FROM VISCOUS LIQUIDS
Filed June 5, 1963

INVENTORS
WRAY H. JONES,
ORWIN G. MAXSON &
BY BILLY W. TERRY

ATTORNEY 3,273,319
DEVICE FOR REMOVING ENTRAINED GASES
FROM VISCOUS LIQUIDS
Wray H. Jones, Orwin G. Maxson, and Billy W. Terry, Ponca City, Okla., assignors to Continental Oil Company, Ponca City, Okla., a corporation of Oklahoma
Filed June 5, 1963, Ser. No. 285,718
3 Claims. (Cl. 55—199)

This invention relates to a device for freeing liquids from gases which are entrained therein.

It is frequently desirable in various industrial processes to remove entrained or trapped gases from liquids, either for the purpose of recovering the particular gas for more economical practice of a particular process, or because the gas is an undesirable constituent of the liquid in the subsequent steps to which the liquid is to be subjected in a particular process being practiced. With some types of liquids, particularly those which are of relatively low viscosity, gas removal does not present a substantial or difficult problem and sometimes may be effected by merely permitting the liquid to stand quiescently or "weather" over a sufficient period of time to permit the entrained gases to be removed from the liquid by effervesence. However, with more viscous liquids, and amorphous or semiliquid substances, the trapped gas is tenaciously retained in the body of the liquid, and its removal constitutes a problem requiring the use of complicated and expensive equipment. For example, it has heretofore been proposed to subject the viscous liquid to high temperatures and subatmospheric pressures for the purpose of reducing its viscosity and extracting from the body of the liquid the entrained or trapped gases. In some of the heating and evacuating procedures, the liquid is injected into a heated vacuum chamber in the form of a plurality of fine streams through a spreader plate having a plurality of holes. In many instances, the rate at which a given volume of liquid can be degassed is so low as to make the procedure impractical except in situations where an extremely high economic advantage characterizes the use of the gas-free liquid as opposed to the liquid with a small amount of gas entrained therein. In some cases, gas removal must be effected by a batch process and this procedure is, of course, subject to the time and quantity limitations which normally characterize batch processes as opposed to a continuous process. Occasionally, it will be possible to remove the gas by substantially lowering the temperature of the liquid-gas mixture to condense the gas and then separating the mixture in a centrifuge, separatory funnel or other separating device. This procedure, however, is also expensive and time-consuming, and is a satisfactory and acceptable procedure in relatively few situations.

In summary, then, devices and apparatus previously devised for effecting the separation of an entrained or entrapped gas from liquids have generally been characterized by one or more of several disadvantages which include the removal of only a small portion of the gas contained in the liquid, excessive expense or cost required to effect a satisfactory degree of removal, excessively long time periods required to obtain a satisfactory degree of removal, limitations of the use of the separating equipment to liquids of relatively low viscosity and the inclusion of a number of elements in the apparatus which require constant monitoring and manipulation in order to assure a satisfactory degree of gas removal.

The present invention is a device which may be employed to quickly remove entrained or trapped gas from a fluid. The apparatus is extremely simple compared to substantially all of the previously existing devices of this type known to applicants, being characterized in having no moving parts. The relatively few fixed parts used in the device are structurally rugged and not subject to frequent malfunction. The device can be used to continuously degas substantially any liquid which can be pumped through a conduit, and presents manifest advantages over prior art devices, particularly in the degassing of liquids of high viscosity. For example, the invention has been successfully used to degas blends of paraffin wax and synthetic resin copolymer having a viscosity as high as 10,000 centipoises at 250° F., and is capable of removing entrained gases from fluids with viscosities up to $10^{10}$ poises, such as those of molten plastics.

In one of its broader aspects, the invention may be summarily described as comprising a member for confining a stream of liquid and having at least one outlet, such as a radial aperture through a wall thereof, with means, such as a screen or perforated plate, positioned in the member in alignment with the aperture and extending across the path of flow of fluid so as to impede the flow of a fluid passing through the member. Where the described basic structure cannot be incorporated in a flow line or other system already provided with a motivating device for passing the liquid to be degassed through the tubular member, it is contemplated by the present invention to include with the member a positive displacement pump or other suitable means for propelling the liquid through the member, including flow across or through the screen or apertured plate positioned therein. As the liquid carrying the entrained gas passes through the apertured plate, a pressure drop is developed across the plate and a radial pressure differential appears to be created across the member in a transverse direction with a lower pressure existing at the radially outer edges of the apertured plate or screen than exists at the center thereof. This pressure differential causes the gas entrained in the liquid to migrate radially in the member, and upon reaching the inner periphery thereof, the gas passes out through the aperture formed in the member.

In most instances, it will be preferred to use a plurality of relatively fine mesh screens in a tubular member, and to provide either a series of very small radial apertures arranged circumferentially around the tubular member in alignment with the screen, or to provide a pair of tubular members or conduits which are loosely connected to each other through a flanged coupling so that a continuous circumferential space exists between the two tubular members and places the internal bore thereof in communication with the atmosphere outside the tubular members. The number and mesh size of the screens which are used in any particular situation will be determined by several factors, such as the viscosity of the liquid from which the gas is to be separated, the flow rate of the liquid through the tubular member, and the diameter of the tubular member in which the screen is incorporated. It may be generally stated that for a given system of gas entrained in a liquid, a certain minimum pressure drop must be achieved across the screen in order to obtain substantially complete separation of the gas from the liquid. Below this minimum pressure drop some gas separation will be achieved, but the removal will not be complete. Again, the pressure drop across the screen will, in any specific situation, depend upon the viscosity of the liquid which is to be passed through the device, the flow rate of the liquid through the device, and the size of the screen pack (in terms of number of screens and the mesh size of each screen).

From the foregoing description of the invention, it may be readily perceived that a minimum number of elements are required in the construction of the device, that there are no moving parts in the device which require manipulation or are subject to malfunction, and that therefore the device is both simple and rugged in construction. The device is extremely efficient in operation, and because of the ability to use the device in effecting the continuous removal of gases from a flowing stream of liquid, the device can effectively separate entrained gases from liquids at a higher rate or capacity than has been characteristic of degassing devices heretofore in use.

It is an object, therefore, of the present invention to provide a device for removing entrained or trapped gases from liquids in an efficient, economical and rapid manner.

A further object of the present invention is to provide apparatus for separating from a highly viscous liquid, a gas which is entrained or trapped therein.

A further object of the present invention is to provide a device which may be used to continuously remove gas from a liquid flowing in a tubular pipe line or similar conduit.

A further object of the present invention is to provide a simple device which can continuously remove substantially all of the entrained, insoluble gas from liquids ranging in viscosity from a low viscosity to a high viscosity.

Yet another object of the present invention is to provide a device for removing entrained gases from liquids, which device is simple in construction and is characterized by a long and trouble-free operating life.

In addition to the foregoing described objects and advantages of the invention, other objects and advantages will become apparent upon reading the following detailed description of the invention in conjunction with a perusal of the accompanying drawing which illustrates the invention.

The sole drawing of the application depicts the device of the present invention with a portion of the device shown in section and a portion shown in elevation.

Referring now to the drawing in detail, reference characters 10 and 12 designate generally a pair of tubular members, such as sections of pipe or other conduit, which tubular members are of substantially the same inside diameter. The tubular members 10 and 12 are each provided at one of their ends with a radially outwardly extending flange, 14 and 16 respectively. The flanges 14 and 16 extend circumferentially around the tubular members 10 and 12 and are apertured to permit the tubular members to be connected together in end to end coaxial alignment by bolts 18 or other suitable means in a manner well understood in the art.

The ends of the tubular members 10 and 12 which carry the flanges 14 and 16 are provided with counterbores 20 which terminate a short distance from the end face of the respective tubular member at an axially facing circumferential shoulder 22. When the tubular members 10 and 12 are connected to each other by bolts 18 extended through the flanges 14 and 16, an annular groove of rectangular cross section is formed by the counterbores 20 and circumferential shoulders 22 of each of the tubular members. Positioned within the tubular members 10 and 12 in the annular groove formed by the counterbores 20 and shoulders 22 is a perforated, liquid obstructing means designated generally by reference character 24. The obstructing means 24 in general comprises a circular plate-like structure which is perforated by a plurality of apertures extending through the structure in a direction parallel to the direction of fluid flow in the tubular members 10 and 12.

In the illustrated embodiment of the invention, the obstructing means 24 takes the form of a pair of spaced, perforated steel plates 26, hereinafter termed breaker plates, which abut the circumferential shoulders 22 of the tubular members 10 and 12. The breaker plates 26 are used to confine and position one or more relatively fine mesh screens 28 which are generally circular in configuration and extend at their peripheral edges into the circumferential groove formed by the counterbores 20 and shoulders 22. Although it will usually be preferable to use a plurality of fine mesh screens 28, it is within the scope of the invention to use only a single screen, which single screen will be operative to remove some of the gas from liquids flowing through the conduits 10 and 12 under certain conditions of operation. Typically, the mesh size of the screens 28 will be at least 100 mesh, although the invention is operative to remove some of the gas from liquids flowing through the tubular members 10 and 12 when screens having diametrically larger openings therethrough are employed.

In assembling the structural elements of the invention, the ends of the tubular members 10 and 12 which carry the flanges 14 and 16 are abutted against each other so that the tubular members are in coaxial alignment with the breaker plates 26 and screens 28 in place as shown in the drawing. The bolts 18 are then passed through the flanges 14 and 16 and are tightened just sufficiently to maintain the tubular members 10 and 12 in longitudinal alignment, but not sufficiently tight to prevent gas from escaping between the abutting end faces of the tubular members.

Although the apparatus thus far described constitutes the portion of the invention which is operative to remove entrained or trapped gases from a liquid flowing in the conduits 10 and 12, it is frequently desirable to include in combination with the described apparatus, some means for propelling or passing the liquid through the tubular conduits. With the latter arrangement, the device may be connected or coupled to a tank or reservoir of quiescent liquid in order to remove entrained gases therefrom by passing the liquid through the degassing apparatus of the invention. To this end, a pump 30, which in a preferred embodiment of the invention is a positive displacement pump, is connected in the tubular conduit 12 to one side of the obstructing means 24. In order to measure and permit recordation of the back pressure just upstream from the perforated obstructing means 24, it is also desirable to have a pressure gauge 32 tapped into the tubular conduit 12 at a point adjacent the obstructing means on the upstream side thereof.

As has been previously indicated, the invention is especially useful for degassing viscous material, such as heavy petroleum products and molten, high molecular weight polymeric materials. The minimum pressure drop which must be obtained across the obstructing means 24 in any given situation will depend upon the viscosity of the liquid to be degassed, its flow rate through the screen and the characteristics of the screens which are used. The precise mechanism by which the present invention operates in effectively freeing a liquid of gases entrained therein is not understood with precision and certainty. It is believed, however, that a radial pressure gradient is established from the center of the screens and breaker plates to the outer periphery thereof, with the lower pressure being adjacent the outer periphery of the screens. It has been observed that the higher the pressure drop across the breaker plates and screens, the greater is the portion of entrained gas removed from the liquid. It is therefore supposed that the pressure differential between the central portion of the screens and their outer periphery is also increased as the pressure drop across the screens along the longitudinal axis of the tubular members is increased. In any event, it has been observed that by adjusting the mesh size, number of screens and the rate of flow of the liquid across the screens and breaker plates, substantially complete gas removal can be effected with all of the types of liquids which have been hereinbefore tested.

The following examples demonstrate the effect of varying the number of screens employed and the mesh size of the screens, and also provide an indication of the effect of varying the flow rate of the liquid through the tubular members to vary the pressure drop across the screens and breaker plates. In each of the examples, the liquid employed was a wax-copolymer mixture comprising 40 percent by weight of an ethylenevinyl acetate copolymer (the copolymer contained about 28 percent vinyl acetate and had a melt index of about 1.482), 40 percent by weight paraffin wax (melting point 145° F.–150° F.), 20 percent by weight recrystallized microcrystalline wax (melting point 180° F.–185° F.) and 25 parts per million oxidation inhibitor. The wax-copolymer mixture had a melting point of 170° F. and a melt viscosity of approximately 10,000 centipoises at 250° F. Air was entrained in this mixture during the blending operation.

In each of the following examples, the described wax-copolymer mixture was pumped through apparatus of the type depicted in the drawing with the tubular members 10 and 12 heated to about 240° F. to retain the wax-polymer blend in a pumpable state. After passing through the degassing device of the invention, the blend was extruded through a strand extrusion die. When air was entrained in the blend, it could be observed in the strands produced by extruding the blend through the die. The pressure drop across the breaker plates and screens was indirectly measured by the use of a pressure gauge positioned as shown in the drawing, which pressure gauge continuously measured the back pressure existing just ahead of the breaker plates and screens. Since only a relatively slight back pressure existed on the downstream side of the screen pack, the pressure measured by the pressure gauge was assumed to represent the pressure drop across the screen pack.

*Example 1*

A screen pack was made up using ten 250 mesh screens between two 150 mesh screens with two breaker plates being employed to support the screens in position between the two tubular members 10 and 12 as depicted in the drawing. The diameters of the counterbores 20 in the tubular members 10 and 12 was about 1⅛ inch. The wax-copolymer mixture was pumped through the breaker plates and screens at a temperature of 240° F. Pumping of the wax-copolymer mixture was commenced at a pumping rate of 132 pounds per hour. At this pumping rate, the back pressure measured on the pressure gauge was 800 p.s.i.g. and substantially complete air removal was obtained. As the pumping rate was increased, the back pressure was increased until a back pressure of 1600 p.s.i.g. was obtained. There was no decrease in air removal as a result of increase in the pumping rate and consequent increase in the back pressure.

*Example 2*

A screen pack was made using five 250 mesh screens between two 150 mesh screens with all of the screens being supported between two apertured breaker plates. Complete air removal was obtained at back pressures between 600 p.s.i.g. and 1500 p.s.i.g., which in turn were produced at pumping rates of from 132 pounds per hour to 226 pounds per hour.

*Example 3*

The screen pack used in this run consisted of four 150 mesh screens supported between two apertured breaker plates. Pumping was commenced at a very low pumping rate and was gradually increased. Corresponding increases in the amount of air removal were noted and complete air removal was not obtained until a back pressure of 500 p.s.i.g. was registered on the pressure gauge. Above this pressure, complete air removal continued to be obtained.

From the foregoing description of the invention, it will be perceived that a very simple and mechanically rugged device has been provided which can quickly and efficiently remove the air from entrained liquids, including liquids which are characterized by relatively high viscosity. The device can be quickly and easily assembled and functions in a manner which permits liquid to be continuously circulated therethrough and the gas to be continuously removed from the liquid in the course of such circulation. The rates at which the liquid can be pumped through the device to effect gas removal are high so that use of the device in an existing flow line will not generally result in any substantial decrease in production rates. The operating life of the device is effectively extended by virtue of the fact that it contains no moving parts which require supervision or constant surveillance by an operator.

Although certain specific details of construction have been hereinbefore described as exemplary of one embodiment of the invention, these details may be changed and, in some cases, omitted, without sacrifice of the working principle of the invention so as to render the device inoperative. For example, instead of a pair of flanged tubular conduits being joined in the manner depicted in the drawing to provide a loose coupling therebetween, a single, integrally formed tubular conduit with a plurality of circumferentially spaced radial apertures being provided therethrough may be employed in conjunction with a screen pack to facilitate the escape of gas from the interior of the conduit. Also, the number of screens employed and the mesh size of the screens are factors which are subject to considerable variation, depending in each instance upon the degree of gas removal desired, the particular type of liquid involved and the flow rate of the liquid appertaining in each case.

These modifications and others which will occur to those skilled in the art are not deemed to lie outside the scope of the invention since the basic principle employed in the present invention to effect gas removal is still employed in devices incorporating such modifications and innovations. It is intended, in other words, that all modifications and changes to the specific structure hereinbefore described and illustrated in the drawing of the present application which do not entail a departure from the basic concepts underlying this invention shall be considered to be circumscribed by the spirit and scope of the invention except as the same may be necessarily limited by the appended claims or reasonable equivalents thereof.

We claim:

1. A device for removing entrained gases from a viscous fluid comprising:
    (a) a first tubular member;
    (b) a second tubular member connected to said first tubular member in coaxial alignment therewith and spaced therefrom to provide an unobstructed gap separating the adjacent ends of said first and second tubular members and
    (c) a screen positioned between said members and extending substantially normal to the longitudinal axis of said members and entirely across the passage created by said tubular members for impeding fluid flow between said members, said screen terminating immediately adjacent said gap in the interior of said members whereby gas flows from said screen through said gap to the exterior of said tubular members.

2. A device for removing entrained gases from a viscous fluid comprising:
    (a) a first tubular member having a circumferentially, radially outwardly extending flange at one end thereof;
    (b) a second tubutlar member having a circumferential, radially outwardly extending flange at one end thereof;
    (c) means for interconnecting said tubular members in end-to-end coaxial alignment through said flanges with said flanges and the ends of said tubular members spaced from each other to establish an unobstructed gap for communication between the interior of said tubular members and the exterior of said tubular members through the gap between the ends of said tubular members;
    (d) a rigid, circular perforated member positioned in and parallel to a plane extending normal to the axes of said tubular members and passing between said flanges, said perforated member extending entirely across the passage created by said interconnected tubular members and terminating within said tubular members immediately adjacent said gap; and (e) means connected to one of said tubular members for moving said viscous fluid through said tubular members.

3. Apparatus for freeing flowing liquids of entrained gases comprising:

(a) a pair of equi-diameter tubular members adapted to be interposed in the path of flow of said liquid and each having a flanged end to facilitate their connection to each other in end-to-end coaxial alignment, each of said tubular members further having a counterbore in the flanged end thereof forming an annular shoulder extending circumferentially around the inner periphery of the respective tubular member;

(b) means loosely connecting the flanges of said tubular members together to establish an unobstructed gap to permit gas to escape between the abutting flanged ends of said members;

(c) a first circular perforated plate of substantially the same diameter as the counterbore in one of said members positioned in said one member and abutting the annular shoulder therein;

(d) a second circular perforated plate of substantially the same diameter as the counterbore in the other of said members positioned in said other member and abutting the annular shoulder therein; and (e) a plurality of screen members filling and positioned between said plates and retained by said plates in planes extending substantially normal to the longitudinal axes of the tubular members.

References Cited by the Examiner
UNITED STATES PATENTS

| | | | |
|---|---|---|---|
| 680,330 | 8/1901 | Jacobson | 55—486 |
| 876,901 | 1/1908 | Ernst et al. | 210—445 |
| 1,703,440 | 2/1929 | Duke | 210—445 |
| 2,404,215 | 7/1946 | Cavanaugi | 210—445 |

REUBEN FRIEDMAN, *Primary Examiner.*
C. N. HART, *Assistant Examiner.*